United States Patent [19]
Livingston

[11] Patent Number: 5,831,812
[45] Date of Patent: Nov. 3, 1998

[54] METER CENTER TAP DUCT

[76] Inventor: Rodney W. Livingston, 5150 Charlemagne Rd., Jacksonville, Fla. 32210

[21] Appl. No.: 908,133

[22] Filed: Aug. 6, 1997

[51] Int. Cl.[6] ............................... H02B 1/20; H05K 7/20
[52] U.S. Cl. ...................... 361/611; 174/68.2; 174/71 B; 174/99 B; 361/639; 361/676
[58] Field of Search ................................. 174/68.2, 70 B, 174/72 B, 71 B, 88 B, 99 B, 100; 361/601, 604, 611–612, 675–676, 690, 624, 637–640, 648–350, 775, 825, 831

[56] References Cited

U.S. PATENT DOCUMENTS

| | | | |
|---|---|---|---|
| 2,997,627 | 8/1961 | Ellegoud | 361/624 |
| 3,467,766 | 9/1969 | Claybourn | 174/100 |
| 4,307,304 | 12/1981 | Kovatch et al. | 361/639 |
| 4,866,568 | 9/1989 | Eggebrecht et al. | 361/611 |
| 5,124,881 | 6/1992 | Motoki | 361/639 |

*Primary Examiner*—Gregory D. Thompson
*Attorney, Agent, or Firm*—Arthur G. Yeager

[57] ABSTRACT

A three-phase electrical distribution system includes an elongate housing of substantially square cross-section and a plurality of frames connected between the top and rear walls of the housing. Each frame includes three sections arranged in a stepped manner to locate and mount one power phase busbar by a standoff insulator near the rear wall, a second power phase busbar forwardly and vertically above the first busbar, and a third power phase busbar located vertically above and forwardly of the other busbars to minimize the cross-sectional housing space while spacing such busbars to prevent arcing therebetween or arcing to the housing or to the frames. The ground and neutral busbars are mounted via insulating standoffs to the bottom wall of the housing forwardly of the power busbars. An access opening is located in the bottom wall at various intervals to provide for hookup of power cables to the busbars via an openable front wall spanning between a pair of adjacent frames. Air vents are provided through the bottom and front walls.

26 Claims, 3 Drawing Sheets

METER CENTER TAP DUCT

BACKGROUND OF THE INVENTION

1. FIELD OF THE INVENTION

The present invention relates to three-phase electrical power distribution systems and particularly to systems for minimizing the physical space required for the enclosure of the system busbars and for providing the maximum flexibility in power line interconnection to the system.

2. PRIOR ART

Three-phase electrical distribution systems require adequate separation of the conducting or power phases from each other and from ground and neutral busbars for purposes of system impedence and the prevention of arcing. The methods employed to achieve the desired spacing, however, utilize excessive amounts of space because the power phases are separated only vertically or horizontally. Such an arrangement is unsatisfactory because the duct or housing enclosure must be physically large and in addition, the physical layout of the separated power phases and ground/neutral busbars drastically limits the flexibility an installer has when building the system. Special hookup structures must be used that require knowledge of where the hookups are to be made. In building shopping centers and other projects, however, the exact size and location of the stores or offices used may not be known in advance. None of the distribution systems of the prior art combine the small physical size and flexibility needed in modern building design and which meet code requirements.

SUMMARY OF THE INVENTION

In one aspect of the present invention there is provided a three-phase electrical distribution system including a conducting busbar for each respective phase, a neutral busbar, and a ground busbar, and an elongate housing having an interior space and a substantially square cross-section including a front wall, a rear wall, a top wall and a bottom wall. A plurality of spaced frames supports the conducting busbars, each frame being attached to the top wall and the rear wall of the housing, and including three spaced support members. One support member is located adjacent the rear wall, a second support member is located spaced forwardly of and vertically above the first support member, and a third support member is located spaced forwardly of and vertically above both the first and second support members. Three attachment means for securing respective conducting busbars to respective corresponding support member for locating the conducting busbars forwardly toward the front wall. Mounting means attach the ground busbar and the neutral busbar to the housing spaced away from each conducting busbar. The conducting busbars are spaced from each other and from the housing and from the support members of each frame to minimize arcing while minimizing the vertical height of the housing.

Other aspects of the present invention include the support member having a vertically disposed portion and horizontally disposed portion spaced from each other and subtending downwardly with respect to the top wall. The attachment means includes an insulating standoff extending horizontally from a respective mounting member. The housing includes a plurality of spaced openings in the bottom wall for electrical access to the busbars and ventilation means for providing air flow to the interior space of said housing. The front wall of the housing is openable and is preferably removably attached to the top and bottom walls to provide access to the interior space of the housing and included are second mounting means for attaching the housing to a wall. The mounting means includes a pair of insulating standoffs and a pair of bolts attached to such standoffs. Features of the invention are seen wherein the housing access means extends through the bottom wall for exposing the busbars to connect electrical cables to the busbars and bolt and nut connectors for attaching flat cable ends to the busbars. The housing also includes a bottom flange extending vertically adjacent the front wall, a pair of spaced brackets connected to the top wall generally aligned with respective frames and the front wall being removably attached to each said bracket and to the flange. Sealing means are sandwiched between the front wall and each of the brackets and the flange.

In other aspects of the invention each frame is formed in a stepped manner to space a first conducting busbar adjacent the rear wall to space a second conducting busbar vertically above and spaced forward of the first conducting busbar, and to space a third conducting busbar vertically above and spaced forwardly of the first and second conducting busbars and to space each conducting busbar away from each other and the housing to prevent arcing therebetween while minimizing the size of the housing.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE PREFERRED EMBODIMENT

Figure 1:
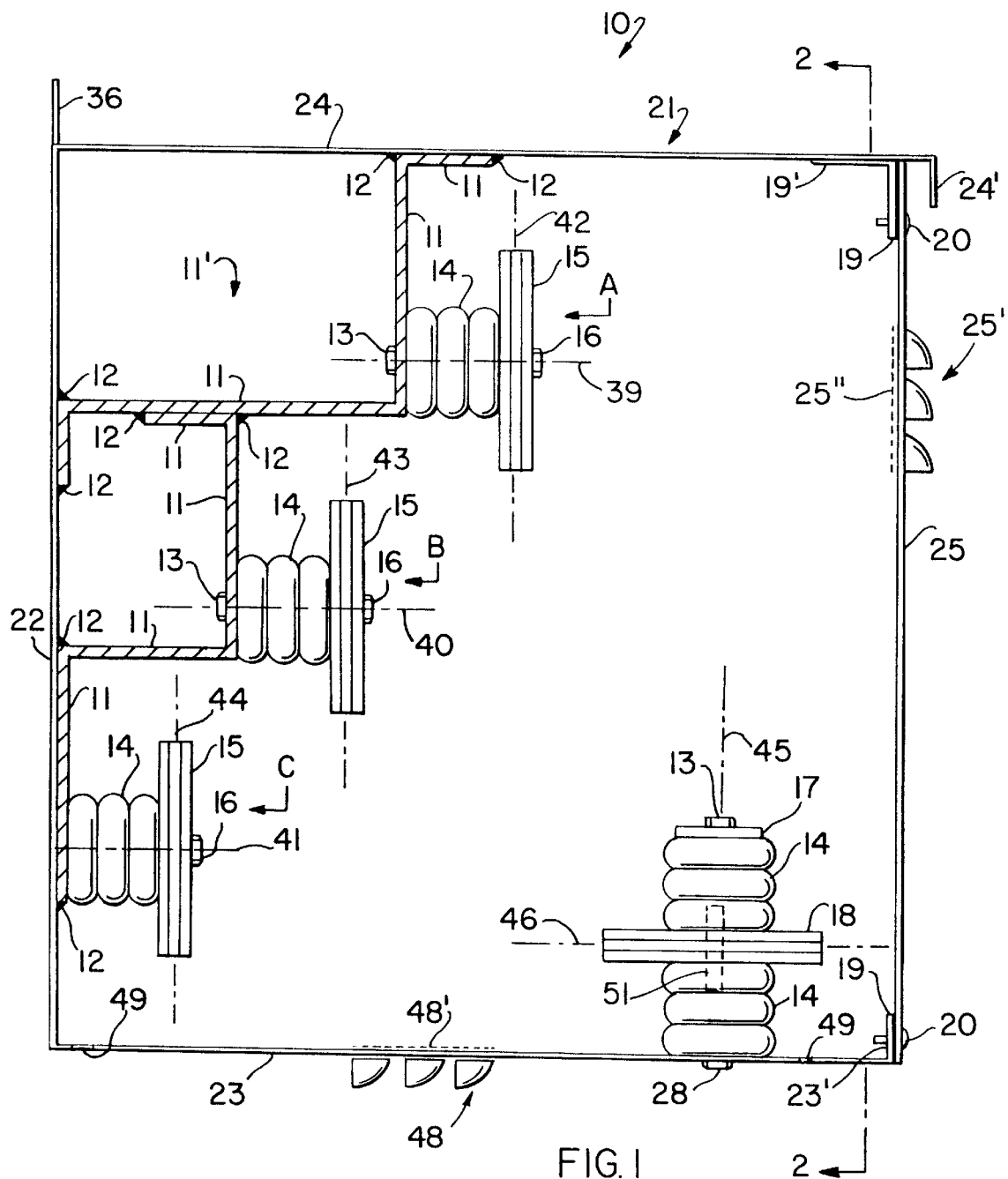
FIG. 1 is a side elevational view of the housing and the internal arrangement of the busbars in accord with the present invention.

With reference to FIG. 1, the power duct in the form of a meter center tap duct 10 according to the present invention includes a plurality of flat bar steel members 11 that are connected via filet welds 12 to form a plurality of vertically and horizontally spaced stepped support frames 11' one of which is shown in FIG. 1. Further filet welds 12 attach each frame 11' between the top wall 24 and rear wall 22 of housing 21.

Bolts 13 and 16 (with convex spring washers 16', FIG. 2) are used to attach standoffs 14 and conducting bars 15 to each frame 11'. Lower busbar 15 for phase "C" utilizes a stud (not shown) welded to frame 11' instead of bolt 13 to provide a flush fit of housing 21 against a building. Each of the five standoffs (illustrated in FIG. 1) that are used in the present invention are flame resistant fiberglass-reinforced members made of thermoset polyester molding compound and are conventional in the art. Also conventional in the art is the construction of each conducting bar 15 for power phases A, B, and C to be comprised of a plurality of ¼" thick 4" wide copper busbars. The illustrated embodiment of the invention employs three such busbars per conducting bar 15 to provide a current capacity of 3000 amps.

Neutral bar 18 is also constructed of three copper busbars and is insulated from 2" wide single ground copper bar 17 via two standoffs 14 connected to housing bottom wall 23 via bolts 13 and 28 and an external threaded coupler 51 (shown in broken lines) threaded into and spanning between standoffs 14.

Front wall or cover 25 is openable and removably attached to the top and bottom walls 24 and 23 at upper bracket 19' and lower flange 23' via machine screws 20 and neoprene gaskets 19, machine screws 20 being threadedly connected to bracket 19' and flange 23'. Preferably, bottom wall 23 and front wall 25 also have mounted therethrough 4"×4" louvers 48 and 25' which have integral bug screens 48' and 25" respectively. Weepholes 49 provide for moisture removal if the same condenses and collects in the housing. Front ledge 24' directs any water on the top wall 24 outwardly of gaskets 19 and louver 25'.

Figure 2:
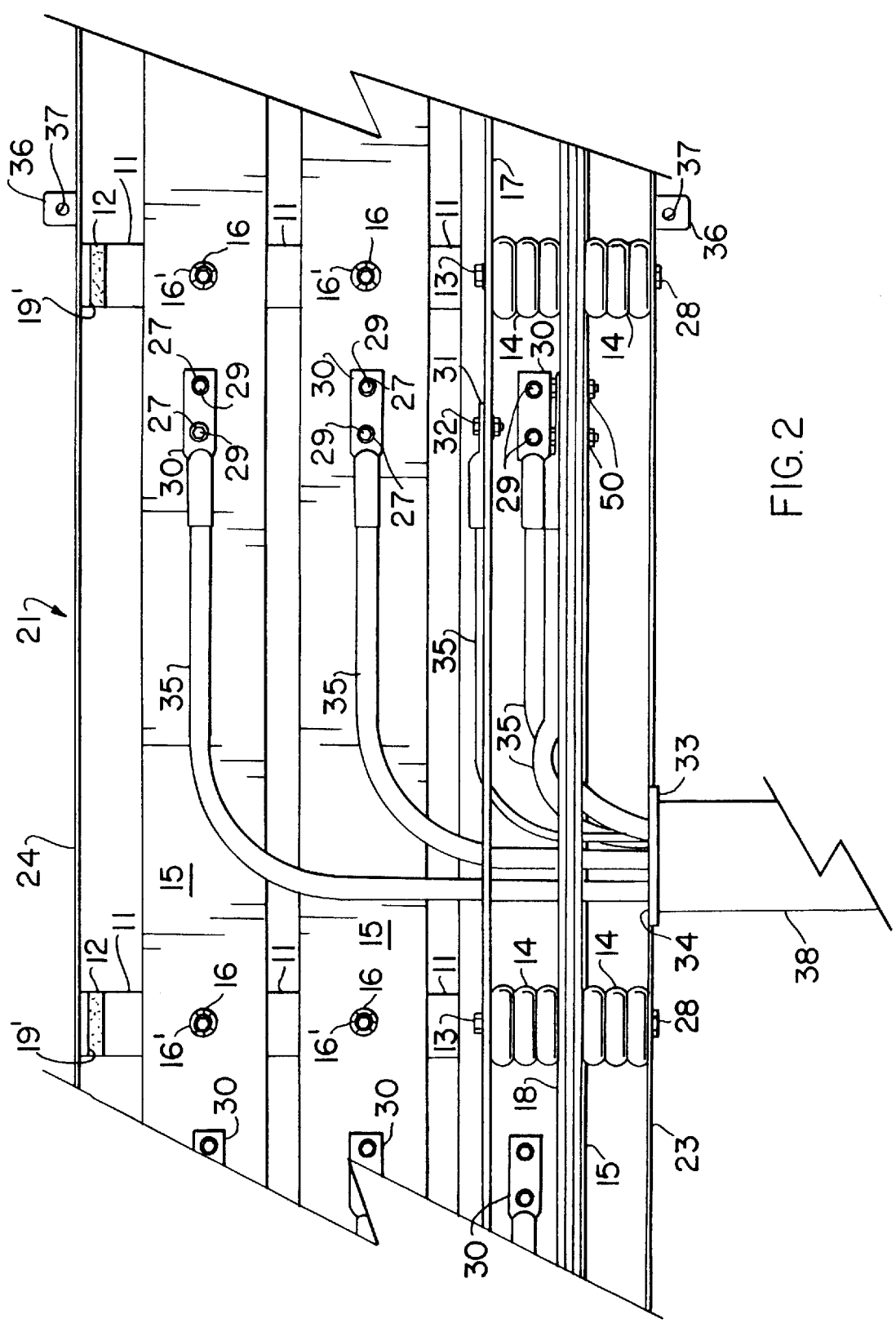
FIG. 2 is a front elevation pictorial view of the housing along the line 2—2 of FIG. 1.

FIG. 2 illustrates a front view of the invention as it appears inside the housing 21 indicated generally by line 2—2.

A standard 3 ½" conduit 38 is mounted through the bottom wall 23 of housing 21 via entry opening 34 and flange fitting 33. The conduits 38 are spaced at irregular intervals in accord with expected or desired locations. Louvers 48, as desired may be suitably located between the conduits 38. The frames 11' may be spaced 24"–27" apart.

Power cables 35 are conventional in the art and have either one-hole 31 or two-hole 30 long barrel lugs on the ends thereof for attachment to bars 15, 17, 18 via bolts 29 (or 32), convex spring washers 27 and nuts 50. Mounting feet 36, spaced 5' apart, include bolt holes 37 for support of the housing 21 to a building (not shown).

With respect to FIG. 1 again, the chief features of the present invention can be summarized.

The three-phase electrical distribution duct system 10 includes a conducting busbar 15 for each respective phase A, B, and C and a neutral busbar 18, and a ground busbar 17. The housing 21 is constructed to be substantially a square cross-section to minimize the space the duct occupies, particularly the space from the ceiling to afford head room to walk thereunder and or to accept other tall equipment thereunder. The frames 11' for supporting the conducting busbars are attached between the top wall 24 and the rear wall 22 of the housing 21 as shown. The frame 11' includes spaced support members 11, one of which is located adjacent the rear wall 22, a second being located spaced forwardly of and vertically above the first. A third support member 11 is located spaced forwardly of and vertically above both the first and second support members 11. Three attachment means in the form of standoffs 14 and bolts 16 are used for securing each conducting busbar 15 to a corresponding support member 11 to locate each conducting busbar forwardly and adjacent corresponding support member. The mounting means for mounting the ground busbar and the neutral busbar spacedly away from each of the conducting busbars includes a pair of standoffs 14 and bolts 13 and 22. Vertical axes 42, 43, and 44 and corresponding horizontal axes 39, 40, and 41 illustrate the stepped arrangement of the spaced locations of the corresponding busbars 15 for phases A, B, and C respectively. Vertical axis 45 and horizontal axis 46 illustrate the mounting arrangement for neutral busbar 18 and ground busbar 17.

Figure 5:
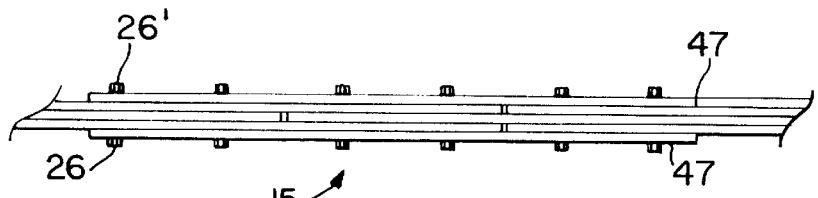
FIG. 5 is a top pla n view of the splice of FIG. 4.
Figure 4:
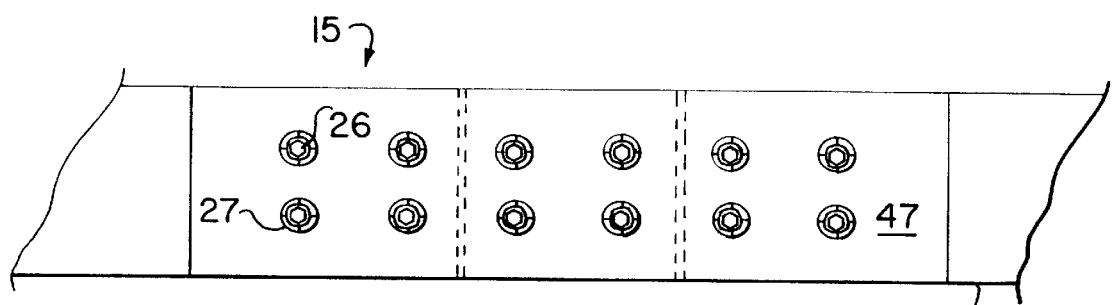
FIG. 4 is a side elevational view showing a conventional busbar splice.

FIGS. 4 and 5 illustrate a conventional busbar splice utilizing bolts 26, washers 27, and nuts 26' to secure splicing plates 47.

Figure 3:
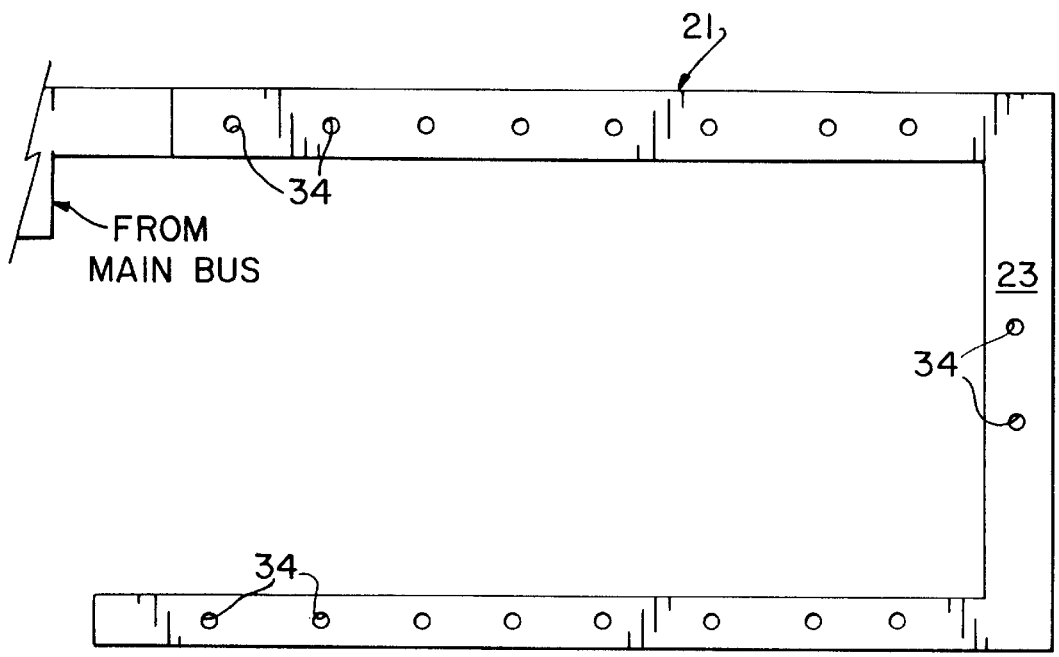
FIG. 3 is a bottom plan pictorial of a typical application of the present invention.

FIG. 3 illustrates a possible arrangement of input openings 34 in a U-shaped housing 21 used in a shopping center area or in an OSW building (Office, Showroom, Warehouse). As shown clearly in FIG. 2, power cables 35 can easily be connected to the various busbars 15, 17, 18 at any desired location because of the stepped structure of each the frames 11' facing the openable front wall and the spaced location of ground and neutral bars 17 and 18 all convenient to the electrician via front wall openings.

The invention has been primarily described in connection with a three phase system, but could readily be adapted to a single phase, i.e., two conductor busbars, without departing from the invention.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A three-phase electrical distribution system comprising a conducting busbar for each respective phase, a neutral busbar and a ground busbar, an elongate housing having an interior space and a substantially square cross-section including a front wall, a rear wall, a top wall and a bottom wall, a plurality of spaced frames means for supporting said conducting busbars, each said frame means being attached to said housing, each said frame means including three spaced support members, one said support member being located adjacent said rear wall, a second support member being located spaced forwardly of and vertically above said first support member, a third said support member being located spaced forwardly of and vertically above both said first and second support members, three attachment means for securing respective said conducting busbars to respective corresponding said support members for locating said conducting busbars forwardly toward said front wall, and mounting means for mounting said ground busbar and said neutral busbar to said housing spaced away from each said conducting busbar, said conducting busbars being spaced from each other and from said housing and from said support members to minimize arcing while minimizing the vertical height of said housing.

2. The system as defined in claim 1 wherein each said second and third support member includes a vertically disposed and horizontally spaced mounting member subtending downwardly with respect to said top wall.

3. The system as defined in claim 2 wherein each said attachment means including an insulating standoff extending horizontally from a respective said mounting member.

4. The system as defined in claim 1 wherein each said attachment means includes an insulated standoff, and a bolt to attach respective said busbar to respective said standoff.

5. The system as defined in claim 1 wherein said housing includes a plurality of spaced openings in said bottom wall for electrical access to said busbars.

6. The system as defined in claim 1 wherein said housing includes ventilation means for providing air flow to said interior space of said housing.

7. The system as defined in claim 1 where in said front wall of said housing is removably attached to said top and bottom walls to provide access to the interior space of said housing.

8. The system as defined in claim 7 wherein said front wall and bottom wall includes ventilation means for providing air flow through said interior space of said housing.

9. The system as defined in claim 1 further including second mounting means for mounting said housing to a wall.

10. The system as defined in claim 1 wherein said mounting means includes a pair of insulating standoffs.

11. The system as defined in claim 10 wherein said mounting means includes a pair of bolts attached to respective said pair of standoffs.

12. The system as defined in claim 1 wherein said housing includes access means for exposing said busbars to connect electrical cables entering through said bottom wall to said busbars.

13. The system as defined in claim 12 further comprising bolt and nut connectors for attaching flat cable ends to said busbars.

14. The system as defined in claim 1 wherein said housing includes a bottom flange extending vertically adjacent said front wall, a pair of spaced brackets connected to said top wall generally aligned with respective said frames, said front wall being removably attached to each said bracket and to said flange.

15. The system as defined in claim 14 further comprising sealing means sandwiched between said front wall and each of said brackets and said flange.

16. A three-phase electrical distribution system comprising a conducting busbar for each respective phase, a neutral busbar, and a ground busbar, an elongate housing having an interior space and a substantially square cross section including a front wall, a rear wall, a top wall, and a bottom wall, a plurality of spaced frame means for supporting said conducting busbars, each said frame means being formed in a stepped manner to space a first said conducting busbar adjacent said rear wall and to space a second conducting busbar vertically above and spaced forward of said first conducting busbar, and to space a third said conducting busbar vertically above and spaced forwardly of said first and second conducting busbars and to space each said conducting busbar away from each other and said housing to prevent arcing therebetween while minimizing the size of said housing, attachment means for securing respective said conducting busbars to respective said frame means, and mounting means for mounting said ground busbar and said neutral busbar to said bottom wall of said housing and spaced away from each said conducting busbar, said front wall being openable to provide access to said busbars between at least one pair of adjacent said frame means.

17. The system as defined in claim 16 wherein said attachment means includes three insulating standoffs connected between each said frame means and respective said conducting busbars and bolts to attach respective said insulating standoffs to said frame and respective said conducting busbars.

18. The system as defined in claim 16 wherein said mounting means includes a pair of insulating standoffs and a pair of bolts respectively to attach said ground and neutral busbars respectively to said pair of standoffs.

19. The system as defined in claim 16 wherein said housing includes ventilation means in said bottom wall and said front wall for providing for air flow into said interior space of said housing.

20. The system as defined in claim 16 wherein said housing includes access means through said bottom wall to provide for electrical cables to enter said interior space to be connected to said busbars.

21. An electrical distribution system comprising at least two conducting busbars, a neutral busbar and a ground busbar, an elongate housing having an interior space and a substantially square cross-section including a front wall, a rear wall, a top wall and a bottom wall, a plurality of spaced frame means for supporting said conducting busbars, each said frame being attached to said housing, each said frame means including at least two spaced support members, one said support member being located spaced forwardly of and vertically above said first support member, at least two attachment means for securing respective said conducting busbars to respective corresponding said support members for locating said conducting busbars forwardly toward said front wall and mounting means for mounting said ground busbar and said neutral busbar to said housing spaced away from each said conducting busbar, said conducting busbars being spaced from each other and from said housing and from said support members of each said frame means to minimize arcing while minimizing the vertical height of said housing.

22. The system as defined in claim 21 wherein each said support member includes a vertically disposed and horizontally spaced mounting member subtending downwardly with respect to said top wall, each said attachment means including an insulating standoff extending horizontally from a respective said mounting member.

23. The system as defined in claim 21 wherein said front wall of said housing is removably attached to said top and bottom walls to provide access to the interior space of said housing, said front wall and bottom wall including ventilation means for providing air flow through said interior space of said housing.

24. The system as defined in claim 21 wherein said housing includes an additional support member being located spaced forwardly of and vertically above both said one and another support members, and another conducting busbar and another attachment means for securing said another conducting busbar to said additional support member.

25. The system as defined in claim 1 wherein said frame means includes an upper portion and lower portion, said upper portion being attached to said top wall of said housing, said lower portion being attached to said rear wall of said housing.

26. The system as defined in claim 1 wherein each said support member includes a vertically disposed mounting member subtending downwardly with respect to said top wall.

* * * * *